United States Patent [19]

Reninartz et al.

[11] Patent Number: 4,730,878
[45] Date of Patent: Mar. 15, 1988

[54] SKID-CONTROLLED HYDRAULIC BRAKE SYSTEM

[75] Inventors: Hans D. Reninartz, Frankfurt am Main; Helmut Steffes, Eschborn, both of Fed. Rep. of Germany

[73] Assignee: Alfred Teves GmbH, Frankfurt am Main, Fed. Rep. of Germany

[21] Appl. No.: 900,833

[22] Filed: Aug. 27, 1986

[30] Foreign Application Priority Data

Sep. 3, 1985 [DE] Fed. Rep. of Germany ....... 3531437

[51] Int. Cl.$^4$ .......................... B60T 8/32; B60T 8/44; B60T 8/48; B60T 13/12
[52] U.S. Cl. ....................................... 303/114; 303/119
[58] Field of Search ............. 303/114, 116, 119, 61–63, 303/68–69, 92; 60/550, 547.1, 591, 574, 595, 553; 188/358, 359, 181

[56] References Cited

U.S. PATENT DOCUMENTS

| | | | |
|---|---|---|---|
| 4,416,491 | 11/1983 | Belart et al. | 303/92 |
| 4,634,190 | 1/1987 | Wupper | 303/114 |
| 4,660,898 | 4/1987 | Steffes | 303/114 |
| 4,662,688 | 5/1987 | Reinartz | 303/119 X |

FOREIGN PATENT DOCUMENTS

| | | |
|---|---|---|
| 3040562 | 5/1982 | Fed. Rep. of Germany . |
| 3405967 | 8/1985 | Fed. Rep. of Germany . |
| 3417018 | 11/1985 | Fed. Rep. of Germany . |
| 2148428 | 5/1985 | United Kingdom . |
| 2148430 | 5/1985 | United Kingdom . |
| 2148432 | 5/1985 | United Kingdom ................ 303/114 |

Primary Examiner—Douglas C. Butler
Attorney, Agent, or Firm—James B. Raden; Robert P. Seitter

[57] ABSTRACT

A hydraulic skid-controlled brake system comprising a master cylinder (2) pressurizable by a hydraulic force booster (1). The master cylinder piston (5) is provided as a stepped piston, with the small piston step (14) cooperating with the booster piston (4) traversing an annular chamber (19). The large piston step (15) plunges into the annular chamber (19). When the brakes are applied, the pressure fluid flows from a brake circuit (22, 31) into the annular chamber (19) by way of a first pressure fluid conduit (18, 21) and in which a blocking valve (26) is provided. By way of a second pressure fluid conduit (33, 34, 47, 36) the pressure fluid flows from the annular chamber (19) into an intake reservoir (11) in which a current control valve including a blocking slide (35) is provided. The connection (33) to the annular chamber (19), in the brake releasing position, is closed by the large step (15) of the master cylinder piston (5). A defined resetting movement of the master cylinder piston (5), during the skid control, is achieved by blocking the two pressure fluid conduits.

4 Claims, 2 Drawing Figures

SKID-CONTROLLED HYDRAULIC BRAKE SYSTEM

BACKGROUND OF THE INVENTION

The present invention relates to a skid-controlled brake system for use with motor vehicles, comprising a master cylinder pressurizable by a hydraulic force booster. Valve means are provided between the master cylinder and the wheel brakes coupled to the master cylinder, through which valve means pressure fluid can be discharged from the wheel brakes. Pressure fluid discharged from the wheel brakes is reloadable from the pressure chamber of the hydraulic force booster, and the stroke of the brake pedal, during skid control, is limited.

A hydraulic brake system exhibiting these features is known from DE-OS No. 30 40 562.2. This system comprises a hydraulic brake force booster wherein, by way of a pedal-operated brake valve, the pressure of the booster which is proportional to the actuating force is adjustable. The hydraulic force booster is able to actuate a tandem master cylinder coupled to the working chambers of which are wheel brakes. The connections between the working chambers of the tandem master cylinder and the wheel brakes in communication therewith can be disconnected by electromagnetically operable valve means. Moreover, additional valve means are associated with the wheel brakes and are capable of discharging, if need be, pressure fluid from the wheel brakes. As a result thereof, the effective brake pressure in the event of an imminent blocking tendency is decreased so that the vehicle can be adequately reaccelerated.

Pressure fluid as discharged from the wheel brakes during skid control is reloaded from the pressure chamber of the hydraulic force booster. The pressure fluid prevailing in the pressure chamber of the hydraulic force booster is fed, by way of additional valve means, across the cups of the master cylinder piston, into the corresponding working chambers. In these brake systems it is necessary, in order to safeguard a minimum volume in the tandem master cylinder, for the stroke to be limited. For this purpose, when pressure is applied to the working chambers of the tandem master cylinder, pressure is at the same time applied to a so-called positioning sleeve against a spring force in the brake releasing position. This causes the positioning sleeve to come into abutment with a stop of the booster piston and precludes, because of the prevailing effective area conditions, a further displacement of the booster piston and the master cylinder pistons.

In response to the given conditions of the coefficient of friction, in the brake system as described, the case may occur in which the brake pedal, by way of the booster piston, is reset against the actuating force exerted on the brake pedal. Conversely, in low frictional coefficents, at which the blocking limit is already reached at relatively low master cylinder pressures, it is possible for the brake pedal to perform, upon commencement of the skid control, an additional travel in the actuating direction before the stop of the booster piston will get into abutment with the positioning sleeve. An operation of this type is likely to mistakenly convey to the driver the impression that the entire brake system is in a defective condition.

These known brake systems are relatively complex in construction which is due to that the booster piston is guided in the positioning sleeve which, in turn, is slidably disposed in pressure-tight manner on the outer periphery inside the housing. It is, therefore, the object of the present invention to simplify the construction of a hydraulic brake system of the type described and to permit a controlled reset of the brake pedal during skid control. More particularly, the resetting speed is independent of pressure and viscosity.

SUMMARY OF THE INVENTION

In the practice of the present invention, this problem is solved by an annular chamber disposed between the booster piston and the master cylinder piston and traversed by a small step of the master cylinder piston formed as a stepped piston and facing the booster piston. In the annular chamber a large step of the master cylinder piston is sealingly guided, with the annular chamber being in communication, by way of a pressure fluid conduit including a valve, with a working chamber of the master cylinder. The cylinder wall of the annular chamber is provided with a connector which upon movement of the master cylinder piston in the brake applying direction can be opened by the latter and which, by way of a pressure fluid conduit disposed in which is a lockable current control valve, is in communication with the intake reservoir.

Preferably, the valve disposed in the pressure fluid conduit leading from the annular chamber to the working chamber of the master cylinder is a 2-way/2-position valve which is controlled by the pressure in the main conduit connected to the main valve. The valve assumes its blocking position if, during skid control, the main valve opens the passage for the controlled pressure from the pressure chamber of the hydraulic force booster to the main conduit. The current control valve comprises a locking piston supported by a control piston to which the controlled pressure of the force booster is applied and, during the skid control, assumes its opening position thereby permitting the passage of the pressure fluid through the aperture of the current control.

The main conduit which can be connected by way of the main valve to the controlled pressure prevailing in the pressure chamber of the force booster. By way of check valves, the main conduit can be coupled to the brake conduits in communication with the working chambers of the master cylinder so as to cause pressure fluid to be fed, during the skid control, into the brake conduits in communication with the working chambers of the master cylinder.

Advantageously, the connector connecting the annular chamber by way of the pressure conduit to the current control valve, is disposed in the wall of the master cylinder and is closed by the master cylinder piston if the latter is in the brake releasing position. The master cylinder piston includes a ring packing which in this phase is disposed on the side of the connector facing the booster piston and which, during the braking operation, slides on the side of the connector facing away from the booster piston.

To permit a compact and reliable construction of the hydraulic brake system, the blockable current control valve includes two cylinder bores. One of bore is connected, by way of a control conduit, to the main valve and contains a control piston which, by way of a bar or piston rod, cooperates with a blocking piston slidably disposed in the other cylinder bore. The blocking piston is provided with a passageway or port connecting the aperture to the space ahead of the blocking piston which at the end thereof facing away from the piston rod includes a valve member cooperating with the valve seat forming the connector for the return conduit. The valve chamber on the side facing away from the valve member containing the connector for the pressure conduit leads to the annular chamber of the master cylinder.

The major advantage of the brake system according to the present invention resides in that the brake pedal, during skid control, is reset to a precisely predetermined position. The resetting is effected at a speed precisely predeterminable and, more particularly, in a manner independent of pressure and viscosity so that the reset movement is performed substantially unnoticed by the driver of the motor vehicle.

BRIEF DESCRIPTION OF THE DRAWING

The invention can be provided in various embodiments. One embodiment is schematically shown in detail in the accompanying drawing wherein.

Figure 1:
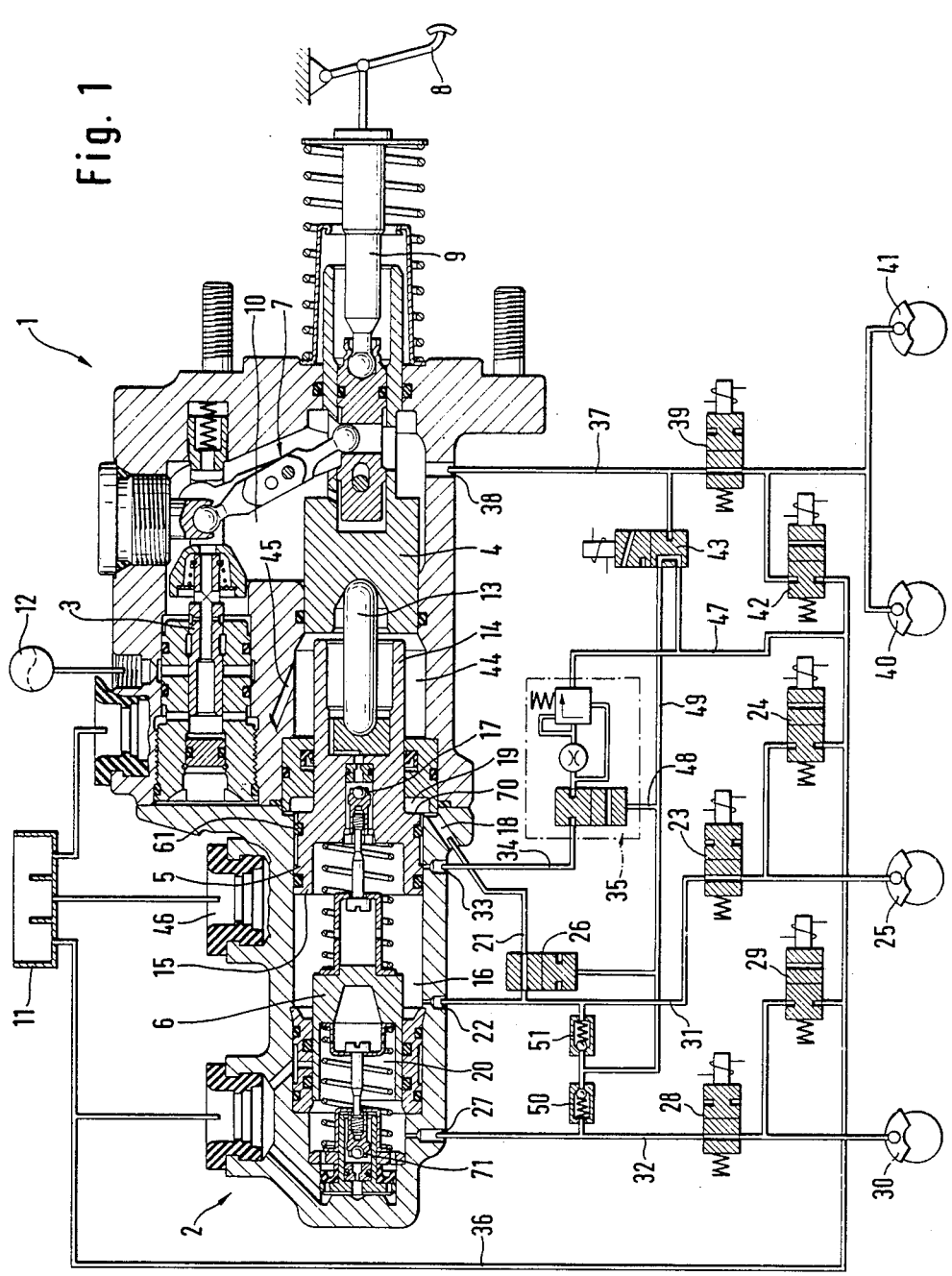
FIG. 1 is a diagram of a skid-controlled hydraulic brake system in accordance with the invention.

DETAILED DESCRIPTION:

With reference to FIG. 1 of the drawing, a hydraulic force booster is designated by numeral 1. The force booster actuates a tandem master cylinder 2 and comprises a brake valve 3 substantially disposed in parallel to the axis of a booster piston 4 and of master cylinder pistons 5, 6, respectively. The brake valve 3, is connected by way of a lever actuation 7, to a push rod 9 in communication with a brake pedal 8. The hydraulic force booster 1 further comprises a pressure chamber 10 which, in the brake releasing position is in communication with a non-pressurized intake reservoir 11 by way of brake valve 3. When force is applied to the brake pedal 8, pressure fluid is passed from a hydropneumatic accumulator 12 into the pressure chamber 10 to thereby build up in the pressure chamber a pressure proportional to the actuating force.

The master cylinder 5 is disposed coaxial to the booster piston 4 and, by a rod 13 disposed between the pistons, 4, is displaceable in the actuating direction. The master cylinder piston 5 is provided as a stepped piston, with the piston step 14 of smaller diameter facing the booster piston 4, whereas step 15 of larger diameter confines a working chamber 16 of the master cylinder 2. The working chamber 16 is normally in communication, by way of a way-responsive valve 17, with the non-pressurized intake reservoir 11. The master cylinder piston 5, between piston steps 14, 15, comprises an annular face 70 confining an annular chamber 19. The master cylinder piston 6 is in coaxial relationship to pistons 4, 5 and, by a pressure building up in the working chamber 16, is hydraulically displaceable in the actuating direction. The master cylinder piston 6 confines a second working chamber 20 which, in the brake releasing position is in communication with the non-pressurized intake reservoir 11 by way of a valve 71, corresponding to valve 17.

A housing connector 22 terminates in the first working chamber 16, coupled to which connector is a hweel brake 25 by way of an electromagnetically operable 2-way/2-position valve 23. The wheel brake 25 is located, for example, on the front axle of a motor vehicle. A housing connector 27 is in communication with the working chamber 20 of the master cylinder 2, coupled to which connector 27, by way of an electromagnetically operable valve 28, is a wheel brake 30 which is also located, for example, on the front axle of the motor vehicle. Connected between the electromagnetically operable valves 23, 28 controlled by a skid monitoring electronics (not shown) and normally taking a passage position, are electromagnetically operable 2-way/2-position valves 29, 24 equally controllable by a skid monitoring electronics (not shown) and normally taking a blocking position. Connected to the electromagnetically operable 2-way/2-position valves 29, 24 is a common return conduit 36 leading to the non-pressurized intake reservoir 11. By suitably reswitching the 2-way/2-position valves associated to the wheel brakes, it is possible for the pressure in each wheel brake 30, 25 to be kept constant or decreased in a manner independent of the pressures prevailing in the working chambers 16, 20 so as to preclude an imminent blocking condition.

Figure 2:
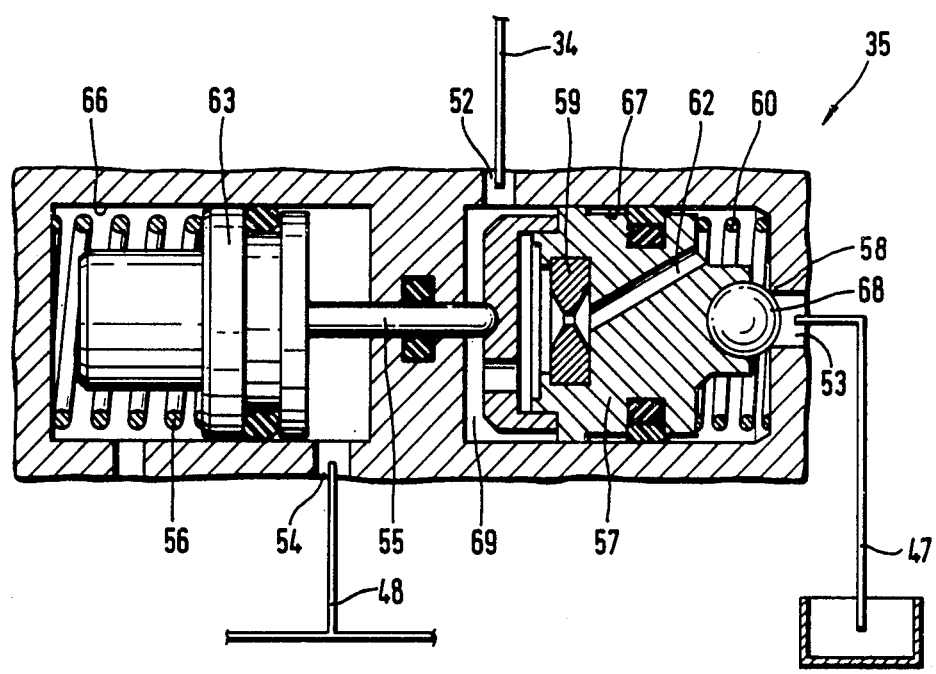
FIG. 2 illustrates the current control valve containing the integrated blocking valve according to FIG. 1.

The master cylinder comprises another housing connector 18 radially terminating in an annular chamber 19 surrounding the master cylinder piston 5. The housing connector 18 is in communication with a pressure conduit 21 which, by way of a pressure-controlled valve 26, is connected to the brake conduit 31. Moreover, the master cylinder 2 includes a connector 33 which, by way of the pressure conduit 34, is in communication with a current control valve 35 as shown in closer detail in FIG. 2. The current control vavle 35 is connected to the main valve 43 which, in turn, by way of the main conduit 49 and the check valves 50, 51, is in communication with the brake conduit 37 connecting the pressure chamber 10, by way of connector 38 and the magnetically operable 2-way/2-position valve 39, to the wheel brakes 40, 41, for example, of the rear axle. Moreover, the 2-way/2-position valve 42 is connected to the brake conduit 37, permitting a return flow of the pressure fluid from the wheel brakes 40, 41 into the return conduit 36.

The operation of the brake system will now be described in greater detail, starting from the brake releasing condition in which no actuating force is exerted on the brake pedal 8 and all parts take the position as shown in the drawing. If an actuating force is exerted on the brake pedal 8, the pressure chamber 10 of the hydraulic force booster 1, by brake valve 3, is first separated from the non-pressurized intake reservoir 11. After a predetermined actuating travel, pressure fluid is fed, in controlled manner, from the hydropneumatic accumulator 12, by way of the brake valve 3, into the pressure chamber 10. The pressure prevailing in the chamber 10 is proportional to the actuating force applied to the brake pedal 8. After the hydraulic pressure in the pressure chamber 10 having exceeded a predetermined level, the booster piston 4 moves to the left, with the movement of the booster piston 4, by way of rod 13, being transferred to the master cylinder piston 5. After a short travel of the master cylinder piston 5, valve 17 closes to thereby separate the working chamber 16 from the non-pressurized annular chamber 44 and the intake reservoir 11, respectively which, by way of a passageway 45 and the connecting piece 46 is in communication with the annular chamber 44. Another displacement of the master cylinder piston 5 in the direction of actuation, after closure of valve 17, results in a hydraulic pressure build up in the working chamber 16, through which also the master cylinder piston 6 is hydraulically displaced in the actuating direction. Consequently, a pressure build-up equally takes place in the second working chamber 20 of the master cylinder 2. The hydraulic pressures generated in the working chambers 16, 20 are fed to the wheel brakes 25, 30 to thereby decelerate the front axle of the motor vehicle.

The pressure prevailing in the first working chamber 16, by way of the opened valve and the pressure conduit 21, is also fed to the annular chamber 19, with piston step 5, 14 being exclusively responsible for the pressure generation in the first working chamber 16.

If the skid monitoring electronics (not shown) detects a critical blocking condition on one or several of the monitored wheels of the motor vehicle, first, the main valve 43 will reswitch to thereby connect, by way of pressure conduit 47, the brake conduits 31, 32 and the annular chamber 19 of the master cylinder 2 to the pressure chamber 10 of the hydraulic force booster. The pressure of the pressure chamber 10 is fed to the control connectors of the valve 26 and of the current control valve 35 to thereby cause the valves 26, 35 to reswitch. The reswitch of valve 26 results in the annular chamber 19 being hydraulically blocked. By the reswitch of the current control valve 35, the housing connector 33, by way of pressure conduit 47, is connected to the non-pressurized intake reservoir 11.

The current control valve 35 is switched so that all the connectors 52, 53, 54 thereof (FIG. 2), in the resting position, are non-pressurized because the main valve 43 decouples the main conduit 49 from the brake conduit 37 under controlled pressure. Upon operation of the brake pedal 8, connector 52 is under the same pressure that prevails in the annular chamber if seal 61 of the master cylinder piston 5 has overriden the connector 33. The pressure will then act upon the piston rod 55 and, hence, against the compressive spring 56. The compressive spring 56 in each pressure range ensures a proper closure of the valve 35. In a critical blocking condition (after switching of the main valve 43) on connection 54, the controlled pressure will become effective so as to cause the piston 57 of the valve 35 to move out of its resting position and release the valve passage at 58, with the pressure prevailing in the pressure conduit 34 acting on the piston 57 to the right. The pressure fluid flows across the aperture 59 and the port 62 to the righthand side of the piston 57. The resultant pressure (plus the force of spring 60) acts to the left, with a state of equilibrium developing, to thereby cause a uniform drain of pressure fluid from the pressure conduit 34 by way of connector 53 and return conduit 47, 36 to the intake reservoir 11 until the master cylinder piston 5 with the seal 61 thereof covers the connection 33.

What is claimed is:

1. A hydraulic skid-controlled brake system for use with motor vehicles comprising a master cylinder (2) having a master cylinder piston and being pressurizable by a hydraulic force booster (1) having a booster piston, wherein valve means (24, 29, 42 and 23, 28, 39 and 43, respectively) are provided between the master cylinder (2) and the wheel brakes (25, 30, 40, 41) connected to the master cylinder through which pressure fluid is discharged from the wheel brakes (25, 30, 40, 41), with pressure fluid discharged from the wheel brakes being reloadable from the pressure chamber (10) of the hydraulic force booster (1) and wherein, during slip control, the stroke of the brake pedal (8) is limited, wherein an annular chamber (19) is disposed between the booster piston (4) and the master cylinder piston (5) which annular chamber is traversed by a small step (14) facing the booster piston (4) of the master cylinder (5) formed as a stepped piston, and in which annular chamber a large step of the master cylinder piston (5) is sealingly guided, with the annular chamber (19) being in communication, by way of a pressure fluid conduit (18, 21, 22) in which a valve (26) is provided with a working chamber (16) of the master cylinder (2), and with the cylinder wall of the annular chamber (19) being provided with a connector (33) which, upon movement of the master cylinder piston (5) in the actuating direction is opened by the latter, and which is in communication with the intake reservoir (11) by way of a pressure fluid conduit (34, 47, 36) in which a blockable current control valve (35) is provided, the valve (26) provided in the pressure fluid conduit (18, 21, 22) leading from the annular chamber (19) to the working chamber (16) of the master cylinder (2) is a 2-way/2-position valve which is controlled by the pressure in a main conduit (49) connected to a main valve (43), with said 2-way/2-position valve (26) taking its blocking position when, during the skid control, the main valve (43) opens a passage for the controlled pressure from the pressure chamber (10) of the hydraulic force booster (1) to the main conduit (49), the current control valve (35) comprises a blocking piston (57) which is supported by a control piston (63) to which the controlled pressure of the force booster (1) is applied and which, during the skid control, takes its opening position thereby permitting the passage of the pressure fluid through an aperture (59) of the current control valve (35).

2. A hydraulic brake system according to claim 1, wherein the main conduit (49) which can be connected by way of the main valve (43) to the controlled pressure prevailing in the pressure chamber (10) of the force booster (1) and can be connected by way of check valves (50, 51) to the brake conduits (31, 32) in communication with the working chambers (16, 20) of the master cylinder (2).

3. A hydraulic brake system according to claim 2, wherein the connector (33) connecting the annular chamber (19), by way of the pressure conduit (34), to the current control valve (35), is disposed in the wall of the master cylinder (2) and is closed by the master cylinder piston (5) when said piston (5) is in the brake releasing position, with the master cylinder piston (5) comprising a ring packing (61) which is located on the side of the connector (33) facing the booster piston (4) and which, during the braking operation, slides on the side of the connector (33) facing away from the booster piston (4).

4. A hydraulic brake system according to claim 3, wherein the blockable current control valve (35) comprises two cylinder bores (66, 67), of which one is connected, by way of a control conduit (48), to the main valve (43) and is provided with said control piston (63) which, by way of a bar or a piston rod (55) cooperates with said blocking piston (57) which is slidably disposed in the second cylinder bore (67), with the blocking piston (57) being provided with a passageway (62) connecting the aperture (59) to the space ahead of the blocking piston (57) which, at the end thereof facing away from the piston rod (55), comprises a valve member (68) cooperating with the valve seat (58) forming the connection (53) for a return conduit (47, 36), with a valve chamber (69), on the side facing away form the valve member (68), being provided with the connection (52) for the pressure conduit (34) leading to the annular chamber (19) of the master cylinder (2).

* * * * *